Jan. 25, 1966   J. C. BELYEU   3,231,050
COMBINED BRAKE AND LOAD SUSTAINING
DEVICE FOR TRUCKS AND CARTS
Filed Oct. 7, 1963

INVENTOR.
JOHN C. BELYEU
BY
Paul A. Weilein
ATTORNEY ed States Patent Office 3,231,050
Patented Jan. 25, 1966

3,231,050
COMBINED BRAKE AND LOAD SUSTAINING
DEVICE FOR TRUCKS AND CARTS
John C. Belyeu, 133 Janine Drive, La Habra, Calif.
Filed Oct. 7, 1963, Ser. No. 314,140
3 Claims. (Cl. 188—5)

This invention relates to a combined brake and stabilizing device for trucks, carts, and like wheeled carriers such as used for transporting cargo while being carried in other vehicles, as well as for handling cargo in warehouses, factories, and the like and on docks.

In the use of cargo carts such as above noted for carrying cargo while being transported in larger trucks, railway cars, and similar vehicles, it is essential that such carts be anchored against movement relative to the vehicle employed to transport the carts. Accordingly, it is an object of this invention to provide a novel combined braking and load sustaining device for cargo carts which readily may be operated to engage the floor or surface supporting such carts so as positively to prevent movement of the carts relative to the transporting vehicle and to uniformly distribute the load on the braking device and effectively stabilize the carts. Moreover, in loading and unloading the cargo carts, the brake device may be operated to prevent movement of the carts and to stabilize them.

It is another object of this invention to provide a braking device such as described which includes novel operating means of simple construction operable at will for moving the braking device into braking position and for stabilizing the cart or truck to which the device is attached, there being a novel arrangement of spring means operable to elevate the braking device above the floor or cart supporting surface incident to release of the device from braking position.

It is another object of this invention to provide a braking and stabilizing device such as described which includes a rectangular frame and mounting means therefor connecting the frame with the truck bed for movement between a position elevated from the floor or surface supporting the truck and a position engaging a large area of the floor or truck supporting surface beneath the truck, the mounting means including telescopic members fixed to the truck bed adjacent the corners of the frame in a manner assuring a secure mounting of the frame and free movement thereof without tilting or binding in all movements thereof.

It is an additional object to provide in a device such as described a novel arrangement of cam members, a shaft, and an operating lever for rotating the shaft to move the cams for urging the frame into braking position subject to release upon appropriate movement of the lever and cams, the spring means being located adjacent corners of the frame to elevate the frame upon release of the frame and to maintain the frame in elevated position.

Other objects and advantages of the invention will be hereinafter described or will become apparent to those skilled in the art, and the novel features of the invention will be defined in the appended claims.

Referring to the drawing.

Figure 1:
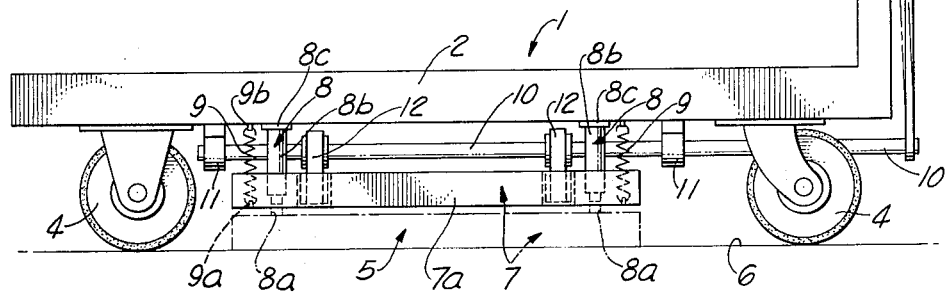
FIG. 1 is a side elevation of a cargo truck equipped with a braking and load sustaining device embodying the present invention, the device being shown in elevated position in full lines and in braking position in dot-dash lines.
Figure 3:
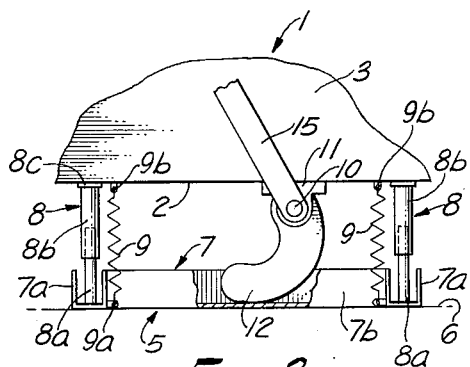
FIG. 3 is a fragmentary end elevation showing the frame in braking and load sustaining position.

The illustrative embodiment of this invention as shown in the accompanying drawing is attached to a wheeled cargo truck or cart 1 having a bed 2, an upright end wall 3, and suitable wheels 4, with the braking and load sustaining and stabilizing device 5 attached to the truck for movement between a position elevated from the floor or truck supporting surface 6 and a position resting on that floor or surface.

As it is desired that the device 5 operate to distribute the truck load over a large area and stabilize the truck during transportation of the truck as well as during loading and unloading thereof, as well as act as a reliable brake, the device includes a comparatively large rectangular frame 7 consisting of channelled steel side members 7a and similar end members 7b welded together with their channelled sides uppermost. As here shown, the frame 7 is about half the length of the truck bed 2 with a width such that it will move freely between the truck wheels, but it is obvious that these dimensions may be varied provided the frame is comparatively large and will serve as an effective load distributing and stabilizing device as well as a brake.

As a means for mounting the frame 7 on the truck bed, the frame and bed are provided with telescoping members 8 fixed on the truck bed 2 and adjacent the corners of the frame, as here shown, with the telescoping members consisting of rods 8a welded in the ends of the channel side members 7a, which ends, as will be apparent with reference to FIG. 1, extend outwardly beyond the joints of the end members 7b with the side members 7a better to accommodate the mounting of the telescoping members and distribute the loads applied to the frame in the movement thereof. The rods 8a are slidable in tubular members 8b fixed as by welding to the plates 8c that may be bolted or otherwise secured to the underside of the truck bed.

Spring means for biasing the frame 7 to elevated position may consist of four rectractile springs 9 which are fixed at their lower ends as at 9b to the projecting ends of the side members 7a, and at their upper ends as at 9b to the truck bed. These springs not only serve to move the frame 7 to elevated position, but operate to hold the frame elevated.

It should be noted that with the telescopic mounting members 8 and the springs located on the projecting ends of the channelled side members 7a of the frame 7, the latter will be freely movable between elevated and braking positions without tilting or binding and will be connected to the truck in a secure manner assuring that it may be readily moved into and from operative position.

Operating means are provided for moving the frame into braking and stabilizing position and for releasably holding the frame in that position. As here shown, this operating means includes a shaft 10 rotatable in bearings 11 on the underside of the truck bed 2 and extending lengthwise of the frame 7 and bed to one side of the longitudinal center line of the bed. Axially spaced on the shaft 11 are a pair of cams 12 which are fixed to and turn with the shaft so as to bear against the bottoms of the channelled end members 7b of the frame 7 between flanges of the end members, these flanges maintaining the cams against the bottoms of the channels. It should be noted that in having the shaft 10 and cams 12 to one side of the longitudinal center of the truck bed 2, the cams will bear uniformly against the centers of the end members 7b and thereby uniformly depress the frame.

Figure 2:
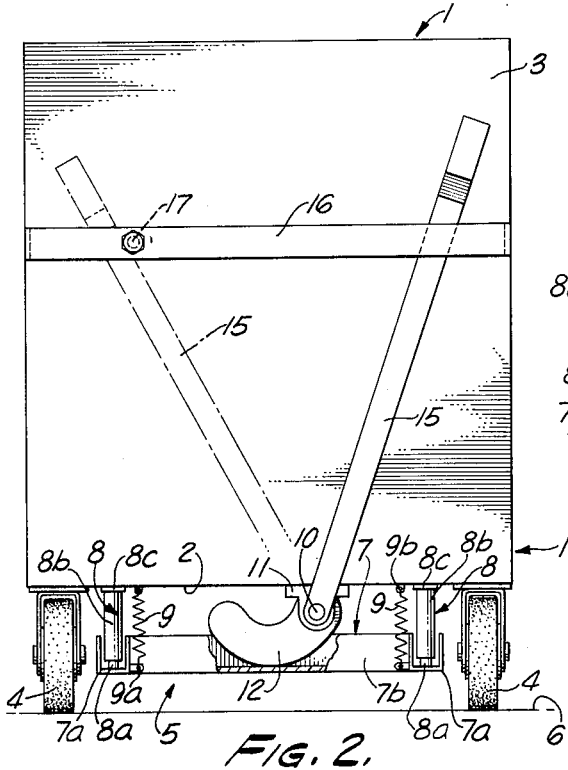
FIG. 2 is an end elevation of the truck showing how the braking device is supported in elevated position and indicating in dot-dash lines the position to which the lever of the operating means is moved to actuate the cams for moving the frame into braking position.

The shaft 10 extends to a position forwardly of the upright wall 3 at the end of the truck and has a lever 15 fixed thereto and extended upwardly therefrom behind a guide bar 16 fixed on the wall 3. When the lever is in the full line position shown in FIG. 2, the cams 12 are raised and the frame 7 is in elevated position, being so held by the springs 9. When it is desired to move the frame 7 into braking position, the lever 15 is moved to the dot-dash position shown in FIG. 2, thereby rotating the shaft 10 and moving the cams 12 so that the cams will uniformly apply pressure at points substantially centrally of the ends of the frame members 7b to depress the frame against the floor or other surface supporting the truck. The lever may be deflected so as to be releasably held by a stop pin 17 as shown in FIG. 1, to maintain the cams in position holding the frame in braking position. To release the cams the lever 15 is deflected past the pin 17 and moved to the right to the full line position shown in FIG. 2.

It should be noted that when the frame 7 is in braking position, the load is sustained primarily by the frame 7 instead of by the truck wheels, thereby positively preventing movement of the truck. This is important when the truck is being transported in another vehicle as the frame will positively prevent the truck, whether loaded or unloaded, from moving about in the transporting vehicle. In some instances it is also desirable to set the brake device when loading and unloading the truck to prevent movement of the truck, and this operation of the brake may be effected at will.

While specific structural details have been shown and described, it should be understood that changes and alterations may be resorted to without departing from the spirit of the invention as defined in the appended claims.

I claim:

1. A combined brake and load sustaining device for a truck having a bed, comprising: a braking and load sustaining member; said member having elongate side members and end members extending between and joined to said side members; mounting means connecting said braking member with the bed of said truck for substantially linear movement between a position elevated from the surface supporting the truck and a position engaging both said side and end members with said surface to prevent movement of and sustain the load of said truck relative to said surface; and operating means connected with said bed and said braking member operable to move said member into and from said positions, said side members and end members having co-planar surfaces throughout the length thereof to engage the surface for supporting the truck; said operating means including a shaft extending across said end members; cams fixed on said shaft to rotate therewith so as to slidably engage said end members at points between the ends of said end members; and means for rotating said shaft for moving said cams to depress said side and end members into said braking position.

2. A combined brake and load sustaining device for a truck having a bed, comprising: a braking and load sustaining member; said member having elongate side members and end members extending between and joined to said side members; mounting means connecting said braking member with the bed of said truck for substantially linear movement between a position elevated from the surface supporting the truck and a position engaging both said side and end members with said surface to prevent movement of and sustain the load of said truck relative to said surface; and operating means connected with said bed and said braking member operable to move said member into and from said positions, said operating means including a rotatable shaft between said truck and said end members; cams fixed on said shaft to rotate therewith so as to slidably engage said end members at points substantially centrally of the ends of said end members; and means for rotating said shaft for moving said cams to depress said side and end members into said braking position; said end members being in the form of channels with the channel sides uppermost; said cams engaging the bottom of said channels between the sides of the channels.

3. A combined brake and load sustaining device for a truck having a bed, comprising: a braking and load sustaining member; said member having elongate side members and end members extending between and joined to said side members; mounting means connecting said braking member with the bed of said truck for substantially linear movement between a position elevated from the surface supporting the truck and a position engaging both said side and end members with said surface to prevent movement of and sustain the load of said truck relative to said surface; and operating means connected with said bed and said braking member operable to move said member into and from said positions, said operating means including a shaft extending lengthwise of said braking member to one side of the longitudinal center line thereof, cams fixed on said shaft to rotate therewith so as to slidably engage said end members at points substantially centrally of the ends of said end members; means for rotating said shaft for moving said cams to depress said side and end members into said braking position; said side and end members being in the form of channels; said side members having end portions projecting outwardly from said end members; said mounting means including telescopic members fixed to said end portions of said side members in the channels thereof and to said bed respectively; said operating means including retractile springs fixed to said end portions of said side members; said cams being engageable with the bottoms of the channels in said end members between the sides of the channels.

References Cited by the Examiner
UNITED STATES PATENTS

| | | | |
|---|---|---|---|
| 862,414 | 8/1907 | Roberts | 188—5 |
| 1,029,301 | 6/1912 | Kertesz | 188—5 |
| 1,197,190 | 9/1916 | Dunn et al. | |
| 2,154,952 | 4/1939 | Mahloch. | |
| 2,185,073 | 12/1939 | Chamberlain | 188—5 |
| 3,005,521 | 10/1961 | Blain | 188—5 |

FOREIGN PATENTS 244,558    3/1947    Switzerland.

MILTON BUCHLER, *Primary Examiner.*

DUANE A. REGER, ARTHUR L. LA POINT,
*Examiners.*